(12) United States Patent
Stavros

(10) Patent No.: US 9,904,773 B1
(45) Date of Patent: Feb. 27, 2018

(54) DIGITAL MEDIA MARKING SYSTEM

(71) Applicant: Christopher Lee Stavros, Morro Bay, CA (US)

(72) Inventor: Christopher Lee Stavros, Morro Bay, CA (US)

( * ) Notice: Subject to any disclaimer, the term of this patent is extended or adjusted under 35 U.S.C. 154(b) by 136 days.

(21) Appl. No.: 14/848,130

(22) Filed: Sep. 8, 2015

Related U.S. Application Data

(60) Provisional application No. 62/047,218, filed on Sep. 8, 2014.

(51) Int. Cl.
*G06F 21/10* (2013.01)
*G06F 21/62* (2013.01)

(52) U.S. Cl.
CPC .............. *G06F 21/10* (2013.01); *G06F 21/62* (2013.01); *G06F 2221/0724* (2013.01)

(58) Field of Classification Search
CPC ....................................................... G06F 21/10
See application file for complete search history.

(56) References Cited

U.S. PATENT DOCUMENTS

| | | | | |
|---|---|---|---|---|
| 7,047,241 | B1* | 5/2006 | Erickson | G06F 21/10 |
| 9,336,360 | B1* | 5/2016 | Ahdritz | G06Q 50/184 |
| 2002/0001395 | A1* | 1/2002 | Davis | G06F 21/10 |
| | | | | 382/100 |
| 2002/0169700 | A1* | 11/2002 | Huffman | G06Q 10/10 |
| | | | | 705/35 |
| 2003/0028651 | A1* | 2/2003 | Schreckengast | G06F 21/10 |
| | | | | 709/229 |
| 2004/0167858 | A1* | 8/2004 | Erickson | G06F 21/10 |
| | | | | 705/55 |
| 2005/0043960 | A1* | 2/2005 | Blankley | G06Q 30/02 |
| | | | | 705/51 |
| 2006/0199163 | A1* | 9/2006 | Johnson | G09B 5/00 |
| | | | | 434/322 |
| 2006/0294371 | A1* | 12/2006 | Fanning | G06F 21/10 |
| | | | | 713/165 |
| 2007/0033154 | A1* | 2/2007 | Trainum | G06F 21/10 |
| 2008/0154965 | A1* | 6/2008 | Pedersen | G06F 8/36 |
| 2008/0274687 | A1* | 11/2008 | Roberts | G06Q 30/02 |
| | | | | 455/3.06 |

(Continued)

FOREIGN PATENT DOCUMENTS

EP 2701090 A1 * 2/2014 ............. G06F 21/10

OTHER PUBLICATIONS

Gaff, Brian M.; "3D IP", Computer, IEEE Computer Society, vol. 47, Issue 10, Oct. 2014, pp. 9-11.*

(Continued)

*Primary Examiner* — Victor Lesniewski
(74) *Attorney, Agent, or Firm* — Mark H. Plager

(57) ABSTRACT

A process for marking authorship of a digital asset in binary format can be done in the following manner. A first author adds a first binary code to the digital asset. Then, a record of a first ownership metadata in the digital asset is stored in a system of records. Next, an ownership of the first binary code is ascribed to the first author. After that, a first licensing metadata is embedding into the digital asset with a time-stamped and auditable record ascribing readability to a first user. Following that, the digital asset is secured by requiring a digital key to obtain the ability to write changes to the digital asset.

5 Claims, 7 Drawing Sheets

(56) References Cited

U.S. PATENT DOCUMENTS

| | | | | |
|---|---|---|---|---|
| 2009/0165140 | A1* | 6/2009 | Robinson | G06F 21/10 726/26 |
| 2011/0289309 | A1* | 11/2011 | Tanenbaum | H04L 9/0825 713/150 |
| 2013/0067333 | A1* | 3/2013 | Brenneman | G06F 17/30796 715/721 |
| 2013/0347056 | A1* | 12/2013 | Kuhlman | H04L 29/06 726/1 |
| 2014/0214684 | A1* | 7/2014 | Pell | G06Q 30/02 705/57 |
| 2014/0229393 | A1* | 8/2014 | Malackowski | G06Q 50/184 705/310 |
| 2014/0283104 | A1* | 9/2014 | Nilsson | G06F 21/10 726/26 |
| 2015/0020151 | A1* | 1/2015 | Ramanathan | G06F 21/6218 726/1 |
| 2015/0278487 | A1* | 10/2015 | Scott | G06F 21/10 726/28 |
| 2015/0278598 | A1* | 10/2015 | Scott | G06K 9/00577 382/100 |
| 2016/0096333 | A1* | 4/2016 | Trinkel | G06Q 10/10 700/98 |

OTHER PUBLICATIONS

Alspaugh, Thomas A.; Scacchi, Walt; "Licensing Security", Fifth International Workshop on Requirements Engineering and Law (RELAW), IEEE, Sep. 25, 2012, pp. 25-28.*

* cited by examiner

DIGITAL MEDIA MARKING SYSTEM

RELATED APPLICATION

This application claims priority to provisional patent application U.S. Ser. No. 62/047,218 filed on Sep. 8, 2015, the entire contents of which is herein incorporated by reference.

BACKGROUND

The embodiments herein relate generally to digital rights management. In particular, embodiments relate to digital rights management in 3-D printing files.

A 3-D printing file is programmed in, what this application generically calls "3-D binary code." This means for every point in space defined by the 3-D printing file has either material or no material. The presence of material is binary in that it is either present or not.

The images in 3-D printing files are "Pictorial, graphic, and sculptural works" that receive copyright protection, and thus statutory ownership rights under both United States and international law. However, 3-D printing files can go through a series of modifications creating, potentially unauthorized derivative works. Further, the exact ownership or authorship of a file, that has many authors, potentially with many assignees, some of which can be works made for hire, can be unwieldy to determine. Embodiments of the disclosed invention solve these problems.

SUMMARY

A process for marking authorship of a digital asset in binary format includes the following steps. First, adding a first binary code to the digital asset by a first author. Then, storing in a system of records, a record of a first ownership metadata into the digital asset. Next, ascribing an ownership of the first binary code to the first author. After that, embedding a first licensing metadata into the digital asset with a time-stamped and auditable record ascribing readability to a first user. Following that, securing the digital asset by requiring a digital key to obtain write for the digital asset.

In some embodiments the process can also include digitally associating a first derivative work metadata into the digital asset ascribing writing permission to a second author. Then, adding a second binary code to the digital asset by the second author; storing a time-stamped and auditable record of a first set of binary code changes to the digital asset. After that, embedding a time stamped and audible record of a second authorship metadata into the digital asset ascribing ownership of the first set of binary code changes to the second author. Following that, nesting attribution relationships to a subsequent author.

A non-transitory computer readable medium stores a program which, when executed by at least one processing unit of a computing device, determines at least one author of a digital asset in binary format. The program has instructions for receiving profile information from at least one user, a first author, and a second author. Then, storing a plurality of digital assets in binary format in a first system of records. After that, embedding authorship metadata onto each of the plurality of digital assets in binary format in the first system of records.

In some embodiments the program can have additional instructions for receiving a request from the second author to obtain a first derivative work metadata into a first digital asset for writing permission for the second author. Then, communicating the request to the first author. After that, receiving permission from the first author to provide the first derivative work metadata into the first digital asset for the writing permission to the second author. Following that, providing the first derivative work metadata into the first digital asset for the writing permission to the second author. Next, receiving derivative work binary code into the digital asset by the second author creating a new digital asset. After that, adding second authorship metadata onto the new digital asset.

In some embodiments the program can have instructions for receiving a known number of new digital assets into the system of records. Then, setting a counter to one. After that, engaging a relationship inference engine to process the new digital assets into the system of records until the counter is equal to the known number of the new digital assets by iteratively performing the following steps. Following that, examining the first new digital asset for the authorship metadata. Next, executing a first new digital binary code to form a three dimensional digital image. After that, executing a binary code of each digital asset in the system of records to form a first set of three dimensional digital images. Then, comparing a new digital asset surface curvature with a digital asset surface curvature for each digital asset in the system of records. Next, comparing a descriptive metadata inside the digital asset to the system of records. After that, determining an authorship of the first new digital asset. Following that, adding the first new digital asset to the system of records. Finally, incrementing the counter.

In some embodiments, the program can have further instructions for receiving a licensing request from the first user for read permission on a first digital asset. Then, communicating the licensing request to the first author and the second author of the first digital asset. After that, receiving permission for the read permission on the first digital asset from the first author and the second author. Following that, adding a read permission metadata onto the first digital asset for the first user.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Figure 1:
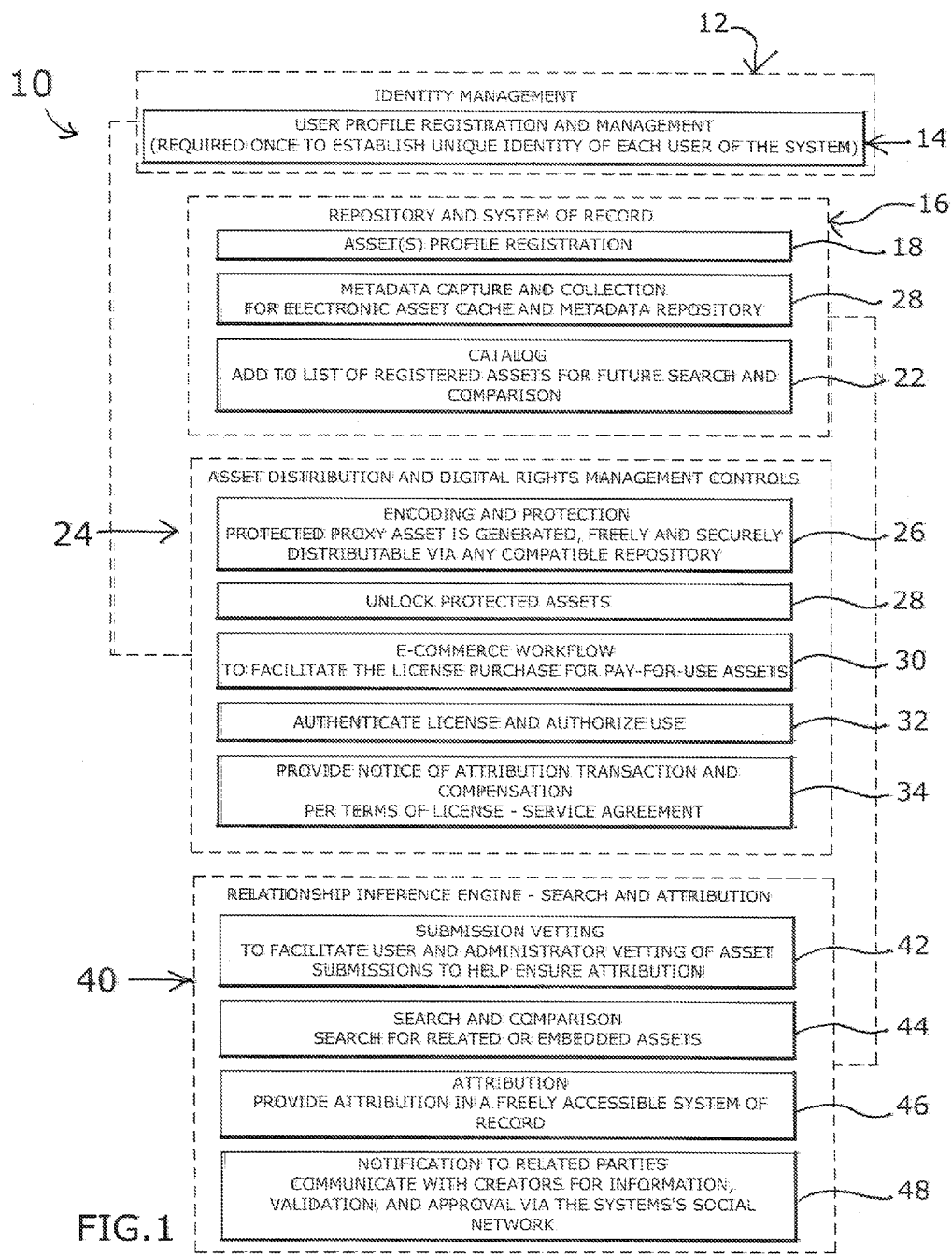
FIG. 1 shows a schematic view of one embodiment of a digital media marking system 10 of the present invention.

By way of example, and referring to FIG. 1, one embodiment of the digital media marking system 10 comprises identity management system 12. At step 14, identity management system 12, requires a user to register a profile.

Profiles are stored system of records 16. Assets are also stored in system of records 16 at step 18. When an asset is stored in system of records 16, the asset is scanned to capture and collect a descriptive metadata to determine the author or authors (or at least one author) of the asset as well as the licensees of that asset and the owner or owners of the asset at step 20. This information is cross-referenced with at least one user that is in identity management system 12 and, as new assets are added into system of records 16 a catalog of rights holders are created at 22. As used in this application, an asset is a digital file that encodes a unique creative work that can be reproduced physically in a tactile form, or embedded in a more complex form, e.g., a 3D design that can be output on a 3D printer, digital milling machine, 3D rendering display, or similar 3D output device. Examples include but are not limited to: .stl, .gpx, .x3g, .scad, as well as proprietary file formats like .thing and .mix files. Each of these files, when executed, results in a binary code that indicates whether material is present or not present at every point in 3-D space defined by the file. There can be more than one binary code, for instance a digital asset may have a first binary code, a second binary code, and so on. Ownership and authorship information is stored such that it cannot be accessed by the owner or author. That is the author knows it is an author, but does not know, from the file or system of record the other authors. Further, authorship is nested starting in original works such that subsequent derivative authors are listed as authors in their work and all children work, but not sibling work.

Digital media marking system 10 further comprises asset distribution system 24. Asset distribution system 24 converts the asset in to a proxy asset at step 26 which can be easily converted into any compatible file format. Here, the disclosed invention system differs from systems that protect other kinds of computer software. The computer software source code is independently copyrightable, but the process of executing the same function with different source code is not copyrightable (it might be patentable). Here, the digital image, regardless of source code, is what is subjected to copyright. In order to compare a file originally made in Autocad® with one made in Solidworks® or Rhino® for instance, a proxy file needs to be created in order to preserve solely the image itself independent of the underlying instructions used to create the image.

An author has the ability to change the author's assets. At step 28, the author can unlock the proxy asset from the system of records in order to make changes to the asset or to use the asset. In some situations, a user may want to license an asset in the system of records in order to make a copy. At step 30, the user can propose or accept license terms from the owner of an asset. Those terms are then authenticated by the asset distribution system which then updates the metadata in the asset file in the system of records 16 at step 32 authenticating new rights for the user in the asset. Metadata can include a variety of information such as the digital asset surface curvature, internal structure, densities, bridges, gaps, voids, embedded elements and parts, and other key descriptive data relating to the new asset, and authorship metadata about the identity of the author. When the user pays in the digital media marking system 10, revenue is appropriately reported and transferred over to the owner at step 34.

The system of records 16 is communicatively coupled to a relationship inference engine 40. The relationship inference engine analyzes new assets as they are inserted into the system of records. In some embodiments this can be done with a while loop using a counter as long as new assets are coming into the system. Not every asset inserted into the system of records 16 would be acceptable. For instance 2-D shapes, or those which are not created by an author (those created by a computer for instance) are not acceptable. Further, very simple shapes such as chords and arcs are not copyrightable because they lack minimal creativity. These assets are vetted out of the system of records 16 and removed at step 42. Of those vetted assets, each asset is then searched to determine what, if any, part of that asset overlaps with an existing asset in the system of records at step 44.

There are many ways that step 44 can be accomplished using pattern recognition techniques, but the following is offered as exemplary. First, each proxy file is executed and two 3-D shapes are created. Then, a series of points are randomly chose on the surface of the existing asset and chords are drawn between the points. After that, the points and chords are drawn onto the new asset to determine the likelihood of a match. When two chords are known polynomial curve fitting can be used to determine the probability of a match. Where a portion of an existing asset is matched, the existing asset's metadata is marked to indicate that the existing asset is more likely to be matched onto a future asset. New assets are compared to existing assets in the order of those that are most likely to result in a match.

The author of the new asset (or the portions of which are found to be new) can then provide into the system of records at step 46: The asset name, the date the asset was made, the relationship to other authors or owners, the version of the asset, and other descriptive information provided by the author. The relationship inference engine 40, then determines, based on the points and chords, the unique features of the file, which are recorded into the metadata in the system of records 24. The author or owner can set a licensing price, if so desired. If the new asset is found to be a derivative work, the system of records 16 will communicate with the other authors and owners of the parent work that a derivative work has been made at step 48. If the other authors and owners had requested approval of the derivative work before the derivative work is entered in the system of records 16, then such approval will be sought through a social network connected to the system of records at step 48. The derivative work, once created, will have a first derivative work metadata.

In some embodiments of the system, metadata can be stored in both the system of records 16 and the digital asset in order to permit auditing. An audit system generates a hash of the first metadata in the asset and checks this against the hash contained in the system of records 16. Having been satisfied that the hash contained in the system of records 16 is the same as that generated from the digital asset, the audit system then prepares a hash of the system of records 16 and compares this with the hash contained a second digital asset such as a derivative work. If the hash of the system of records 16 is the same as the hash in the derivative work, then the chain is verified as being complete. The has includes embedding a time-stamp to compare changes to the system of records 16.

Figure 2:
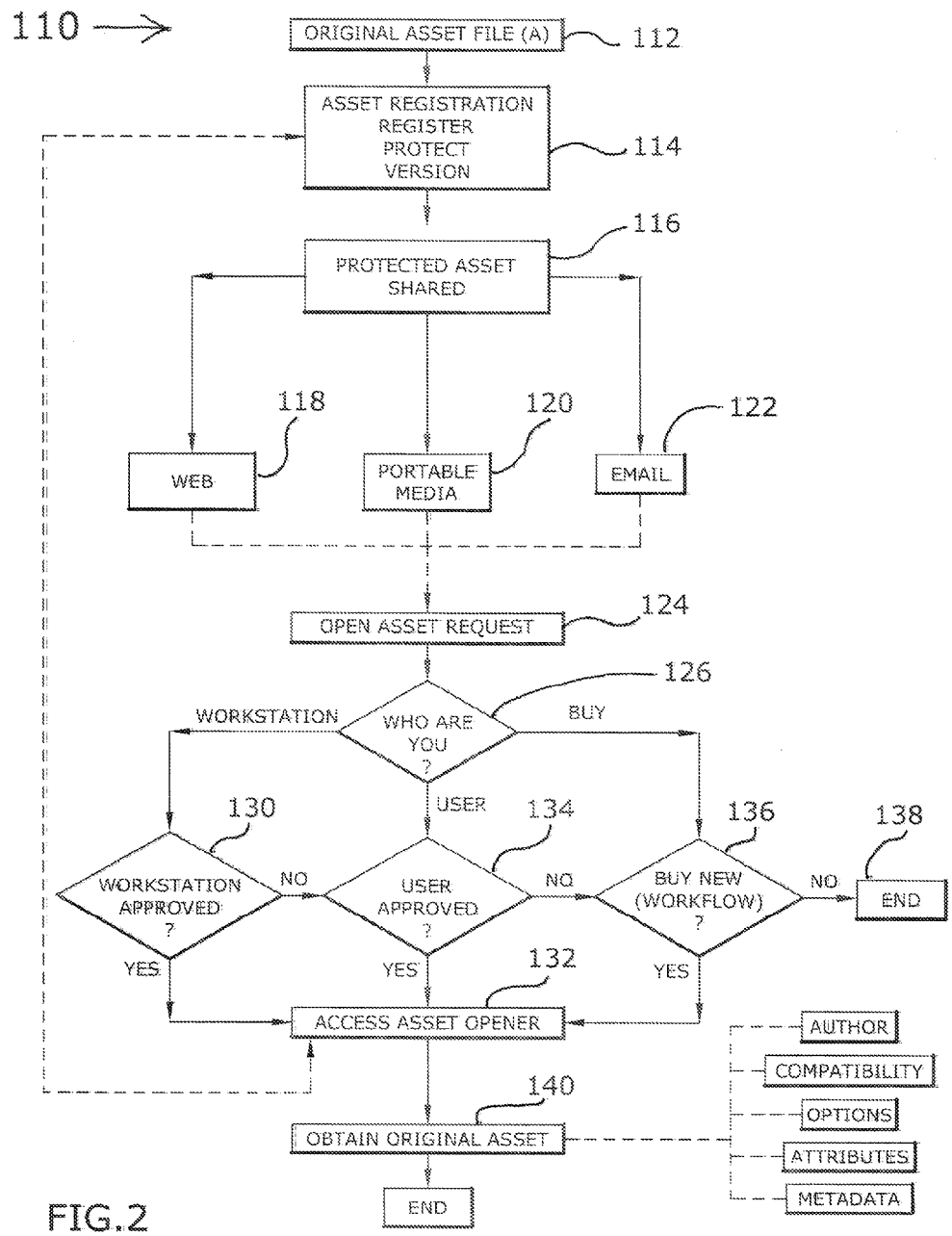
FIG. 2 shows a schematic view of one embodiment of a process for digital rights management flow 110 of the present invention.

FIG. 2 provides a process for digital rights management flow 110. The process for digital rights management flow 110 begins with obtaining an original asset at step 112. The original asset is registered by an author. The asset either natively includes or requests the author to include information for metadata that is recorded centrally at step 114. This creates an abstract file that helps to track attribution for the design and includes but is not limited to: the Original author or authors and owners, a date of creation, a primary key assigned by the system of records 16, a version, a list of embedded attributions supplied by the user, platform specific asset metadata that can be proprietary to a specific target platform, physical attributes like volume, shape, density, Descriptive information, tagging, and associated purpose-specific metadata structures such as extensive markup language document object models (XML DOMs), and other pertinent metadata Metadata is captured in an expandable, universal markup format based on XML and is able to store platform-specific metadata for assets. Metadata sets can also be compounded to allow for a specific asset to be described in deep detail for a specific application. For example, an asset originating from radiological scan may include radiological metadata, patient metadata, and 3-D print metadata, where both the existence of the metadata structures, and its populated attributes, can inform relationships for the inference engine. This allows for designs to be used across various platforms, and for various applications, while retaining and adding platform-specific metadata to the profile record as the metadata content and detail is improved, over time. It also allows for common assets to be used across varying applications and for disparate purposes, while maintaining the integrity of the collective metadata sets. As an asset is utilized across platforms, the collective pool of metadata can expand dynamically to include additional information as needed. This provides the added benefit of serving as a more open and cross-platform compatible format for digital Asset storage manipulation, and application.

The resulting abstract file is freely distributable as a digital file. When a user wants to make use of the original design asset, they must first obtain a copy of the abstract file and open it with the system compatible digital rights management (DRM) utility, a supported application program interface (API), or license the asset directly via a Web browser.

The abstract file is an optional reference to obtain the original file. It is intended to serve as a fortified reference to the original asset, and an interoperable file format that can be supported by other proprietary applications and software for native integration with the System DRM controls at step 116. The abstract file can only be utilized using an algorithm and software interface to unlock or obtain the original asset. This can be done through the web at step 118, portable media at step 120 or email at step 122 as desired by the author.

Once an open asset request is received by the digital media marking system 10 at step 124, the digital media marking system 10 attempts to ascertain the identity of the party seeking access at step 126. At step 128, the digital media marking system 10 attempts to determine if the workstation has a certificate for access to the asset, if so, then an access asset opener portal is opened at step 132. Alternately, the digital media marking system 10 asks the user for identification to validate the identity of the user at step 134. This could be a user name and password, authentication smart card, or anything else that validates the user's identity. If approved then the access asset opener portal is opened at step 132. Finally, the user is offered the opportunity to purchase rights to the asset at step 136. If the user does so, then the access asset opener portal is opened at step 132 if not, then the process ends at step 138. Once, the digital media marking system 10 receives confirmation that the user has some rights, then the user has the ability to choose the rights to utilize at step 140.

Figure 3:
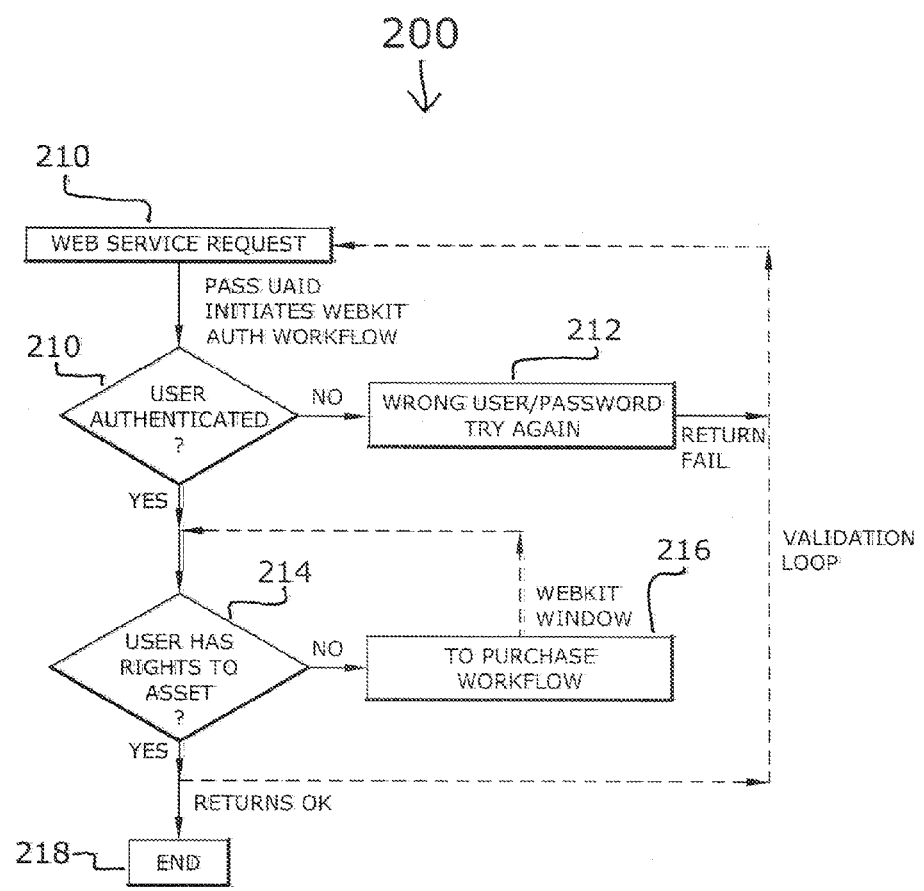
FIG. 3 shows a schematic view of one embodiment of an application program interface 200 of the present invention.

An application program interface 200 for validating digital rights management is shown in FIG. 3. The API 200 begins with a web service request to validate digital rights management at step 210. From there, the user's identification is authenticated at step 210. If the user cannot be authenticated, the user is given another opportunity to provide acceptable identification to the API 200 at step 212. If the user is authenticated, then the API 200 determines whether the user has rights in the digital asset selected at step 214. If the user does not have these rights, the user has the opportunity to purchase these rights at step 216. Alternately, the user is given the opportunity to access the digital rights at step 218.

Figure 4:
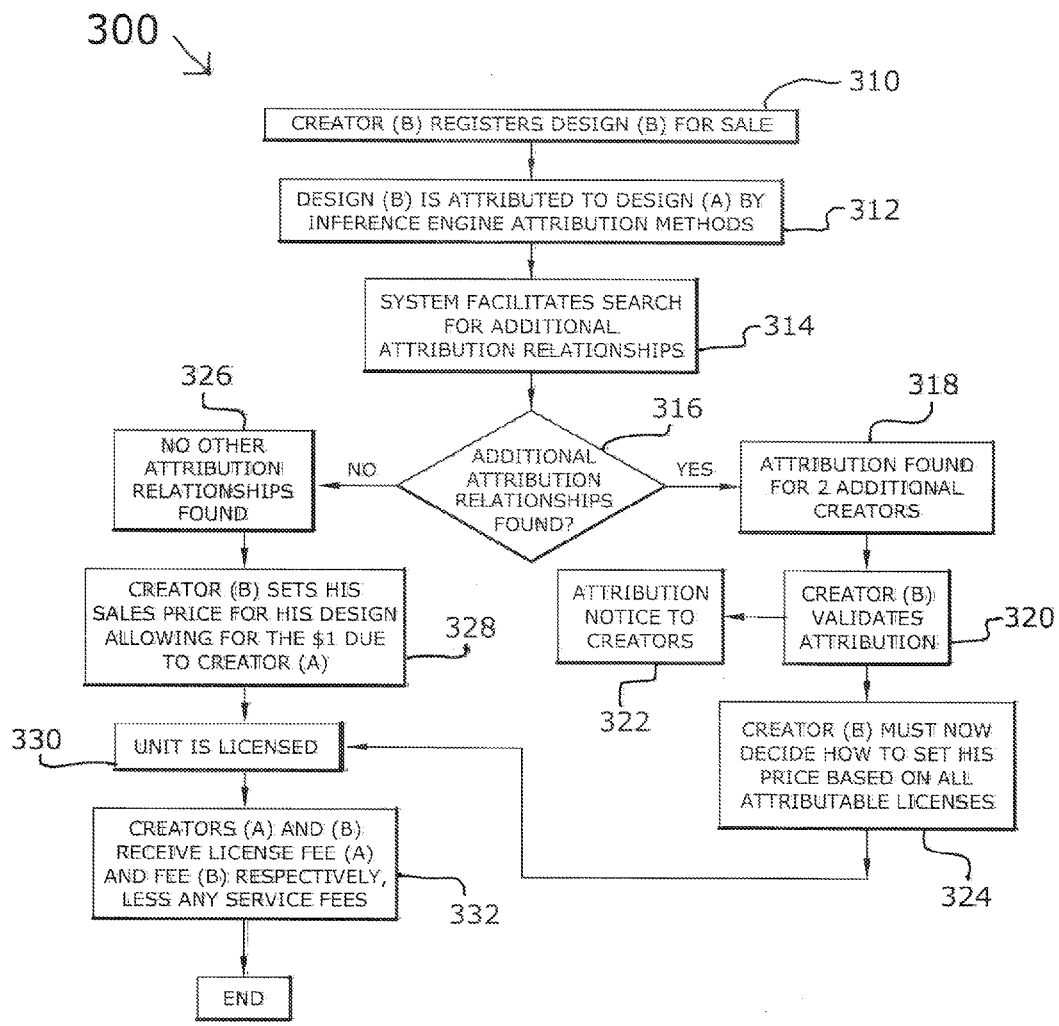
FIG. 4 shows a schematic view of one embodiment of a design registration process 300 of the present invention.

FIG. 4 shows design registration process 300. Design registration process 300 begins when a second author (creator B) offers a second design (design B) for sale at step 310. The inference engine 40, determines that the second design is attributed to a first design (design A) at step 312. The inference engine 40, continues searching through the system of records 16 for additional attribution relationships at step 314. If additional attribution relationships are found in step 316 then those additional authors are noted at step 318. When the second author has a sufficiently protectable unique contribution to the second design, the second author can validate that portion of the design at step 320. Notification of this validated contribution is sent to the other authors at step 322. At that point the second author must determine a price to license its contribution or other such terms (for derivative rights, for instance). That information is added to the metadata for the second design as well as all of the information from portions that involve the rights of other authors and owners in step 324. Alternately, if there is no other attribution found in step 326, then the second author sets a design price which includes a price for the portion of the first author's design that is used at step 328. When the second design is licensed at step 330, the first author, the second author and any other author collect the license fee less any service fee at step 332.

Figure 5:
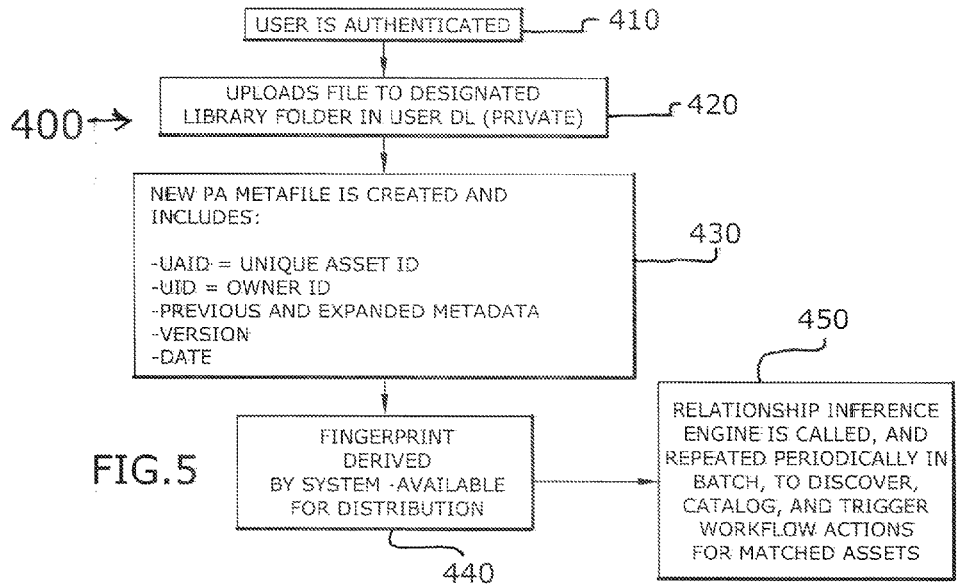
FIG. 5 shows a schematic view of one embodiment of an asset metadata tagging workflow 400 of the present invention.

FIG. 5 shows asset metadata tagging workflow 400 where a user is authenticated at step 410, perhaps using API 200, though this is not required. At step 420, the user uploads an asset in a file to a designated library folder in the user's digital library. As soon as that file is uploaded, a new asset metafile is created at step 430 and includes: a unique user IS, an owner ID, previous and expanded metadata relating to the asset if any is found, a version and date for the asset. As noted above this same information can be stored in the asset file itself. However, this can be unwieldy. All the asset needs to possess is the unique asset identification, from that point, the remainder of data can obtained through indexing in the system of records 16. In some situations, nefarious individuals may want to make fake assets and use those fake assets to extort royalties. To limit that, a fingerprint identification system is used at step 440 to positively identify the user and ensure that the user is the person whom the user claims. While fingerprint identification is preferred other biometric identification techniques can be used as well. In some cases, a digital key can be used as well. At step 450, inference engine 40 can be used to batch, discover, catalog, and trigger workflow actions for matched assets.

Figure 6:
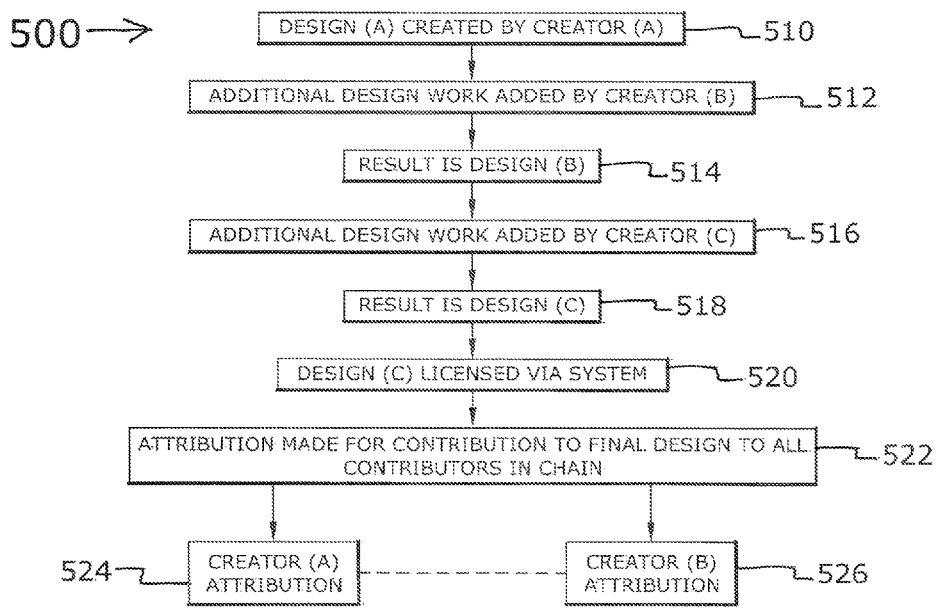
FIG. 6 shows a schematic view of one embodiment of a workflow process for design relation attribution 500 of the present invention.

FIG. 6 shows a workflow process for design relation attribution 500. At step 510, a first author produces a first design. A second author adds additional design work at step 512. This results in a second design at step 514. A third author adds further additional design work at step 516. This results in a third design at step 518. At this point a user licenses the third design at step 520. The third design may be indexed in the system of records 18 as having been made by the third author. However, as indicated in step 522, attribution is made to all authors. In particular the first author's contribution is highlighted at step 524 and the second author's contribution is highlighted at step 526.

Figure 7:
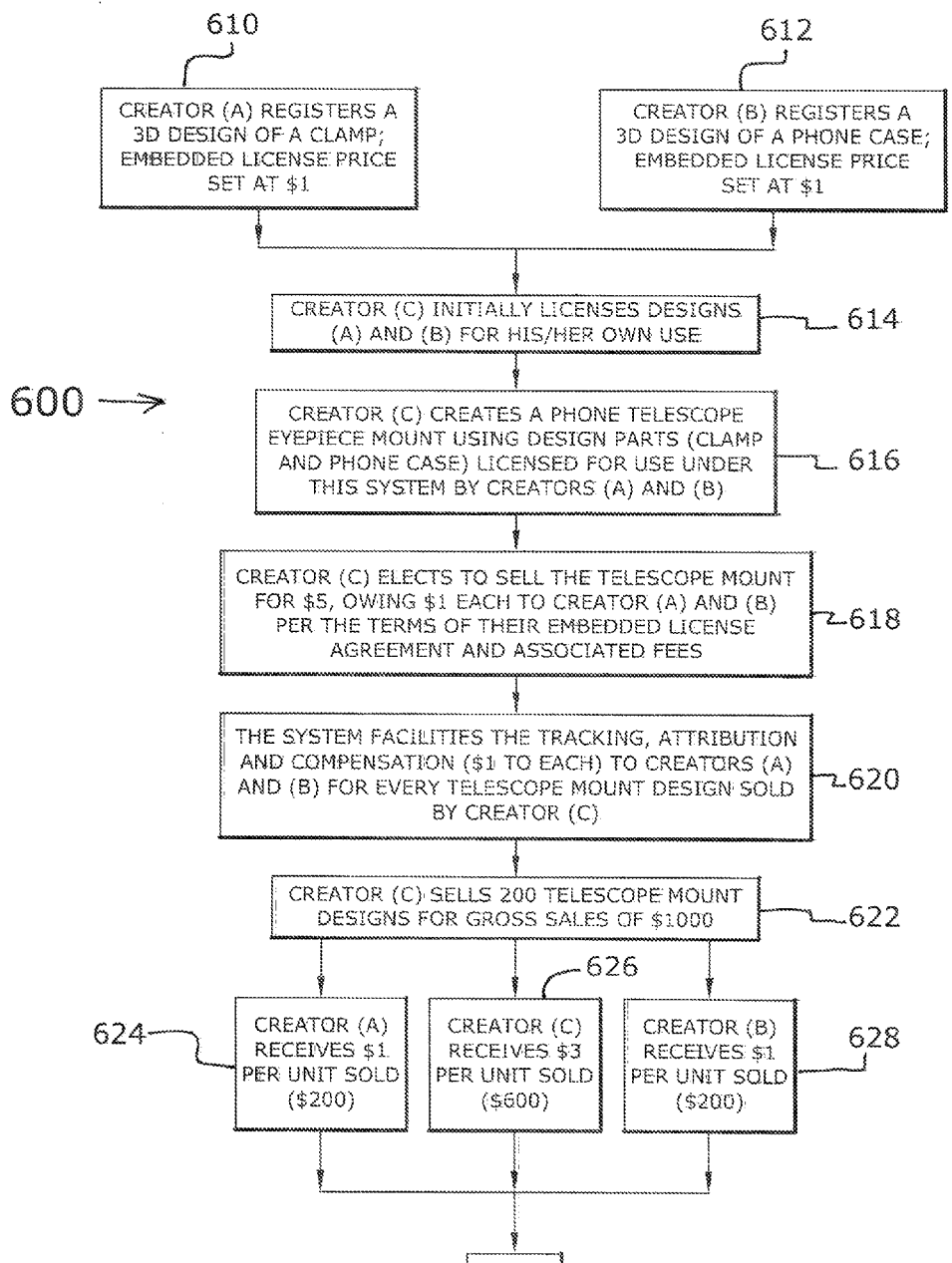
FIG. 7 shows a schematic view of one embodiment of a workflow process for design relation revenue sharing 600 of the present invention.

FIG. 7 shows a workflow process for design relation revenue sharing 600. At step 610, a first author registers a first work that has a first license price. Similarly, at step 612, a second author registers a second work that has a second license price. At step 614, a third author licenses the first work and the second work to create a derivative work. The third author creates the derivative work using, at least some of the first work, at least some of the second work and an independent contribution at step 616 creating a third work.

The third author then makes and sells the third work. The third author pays the first author the first royalty rate and the second author the second royalty rate at step 618. System of records 16 tracks the royalty rates paid in step 620. Step 622, assumes that a 3-D printed work is sold at some gross price. At step 624 a portion of the gross price goes to the first author. At step 626, a portion of the price goes to the second author. At step 628, a portion of the gross price goes to the third author.

Figure 8:
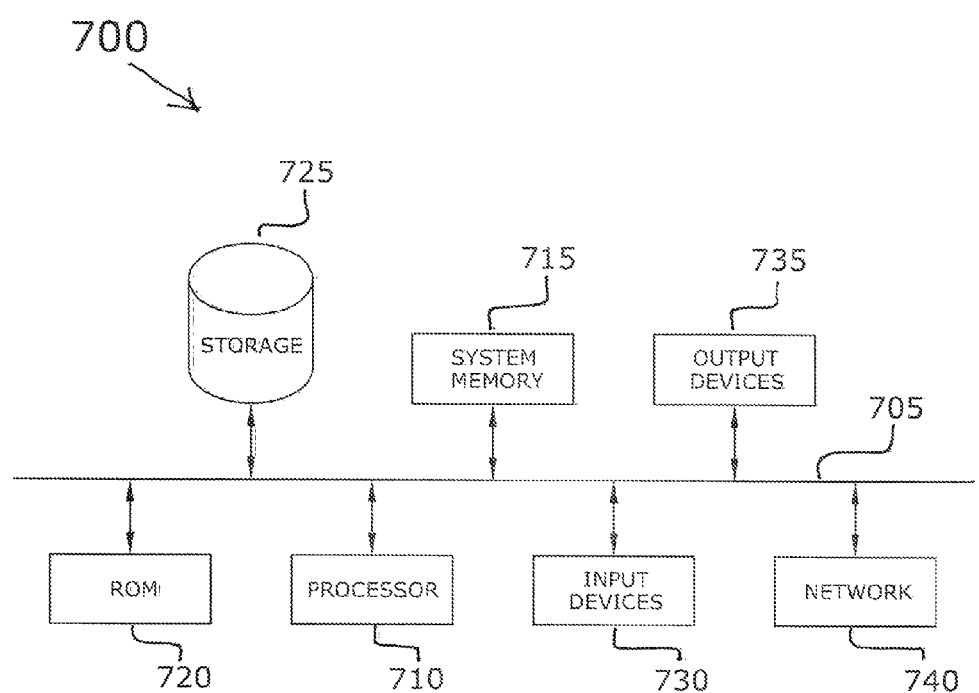
FIG. 8 shows an electronic system view of one embodiment of the present invention.

FIG. 8 conceptually illustrates an electronic system 700 with which some embodiments of the invention are implemented. The electronic system 700 may be a computer, phone, PDA, computing device or any other sort of electronic device. Such an electronic system includes various types of computer readable media and interfaces for various other types of computer readable media. Electronic system 700 includes a bus 705, processing unit(s) 710, a system memory 715, a read-only memory 720, a permanent storage device 725, input devices 730, output devices 735, and a network 740.

The bus 705 collectively represents all system, peripheral, and chipset buses that communicatively connect the numerous internal devices of the electronic system 700. For instance, the bus 705 communicatively connects the processing unit(s) 710 with the read-only 720, the system memory 715, and the permanent storage device 725.

From these various memory units, the processing unit(s) 710 retrieves instructions to execute and data to process in order to execute the processes of the invention. The processing unit(s) may be a single processor or a multi-core processor in different embodiments.

The read-only-memory (ROM) 720 stores static data and instructions that are needed by the processing unit(s) 710 and other modules of the electronic system. The permanent storage device 725, on the other hand, is a read-and-write memory device. This device is a non-volatile memory unit that stores instructions and data even when the electronic system 700 is off. Some embodiments of the invention use a mass-storage device (such as a magnetic or optical disk and its corresponding disk drive) as the permanent storage device 725.

Other embodiments use a removable storage device (such as a floppy disk or a flash drive) as the permanent storage device 725. Like the permanent storage device 725, the system memory 715 is a read-and-write memory device. However, unlike storage device 725, the system memory 715 is a volatile read-and-write memory, such as a random access memory. The system memory 715 stores some of the instructions and data that the processor needs at runtime. In some embodiments, the invention's processes are stored in the system memory 715, the permanent storage device 725, and/or the read-only 720. For example, the various memory units include instructions for processing appearance alterations of displayable characters in accordance with some embodiments. From these various memory units, the processing unit(s) 710 retrieves instructions to execute and data to process in order to execute the processes of some embodiments.

The bus 705 also connects to the input and output devices 730 and 735. The input devices enable the person to communicate information and select commands to the electronic system. The input devices 730 include alphanumeric keyboards and pointing devices (also called "cursor control devices"). The output devices 735 display images generated by the electronic system 700. The output devices 735 include printers and display devices, such as cathode ray tubes (CRT) or liquid crystal displays (LCD). Some embodiments include devices such as a touchscreen that functions as both input and output devices.

Finally, as shown in FIG. 4, bus 705 also couples electronic system 700 to a network 740 through a network adapter (not shown). In this manner, the computer can be a part of a network of computers (such as a local area network ("LAN"), a wide area network ("WAN"), or an intranet), or a network of networks (such as the Internet). Any or all components of electronic system 700 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes may be performed by one or more programmable processors and by one or more set of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

As used in this application, the term "a" or "an" means "at least one" or "one or more."

As used in this application, the term "about" or "approximately" refers to a range of values within plus or minus 10% of the specified number.

As used in this application, the term "substantially" means that the actual value is within about 10% of the actual desired value, particularly within about 5% of the actual desired value and especially within about 1% of the actual desired value of any variable, element or limit set forth herein.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Any element in a claim that does not explicitly state "means for" performing a specified function, or "step for" performing a specified function, is not to be interpreted as a "means" or "step" clause as specified in 35 U.S.C. §112, ¶ 6. In particular, any use of "step of" in the claims is not intended to invoke the provision of 35 U.S.C. §112, ¶ 6.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A process for marking authorship of a digital asset in binary format, the process comprising:
   adding a first binary code to the digital asset by a first author; wherein the digital asset is a three-dimensional design further comprising a general binary code indicating whether material is present for every point in a three-dimensional space defined within the digital asset;
   storing and registering in a system of records, a record of a first ownership metadata into the digital asset;
   ascribing an ownership of the first binary code to the first author;
   embedding a first licensing metadata into the digital asset with a time-stamped and auditable record ascribing readability to a first user;
   securing the digital asset by requiring a digital key to obtain access to write changes to the digital asset;
   digitally associating a first derivative work metadata into the digital asset ascribing writing permission to a second author;
   adding a second binary code to the digital asset by the second author; storing and registering a time-stamped and auditable record of a first set of binary code changes to the digital asset;
   determining pro rata contribution of the first binary code and the second binary code to the binary code;
   digitally associating a second derivative work metadata into the digital asset ascribing writing permission to a third author;
   adding a third binary code to the digital asset by a third author; storing a time-stamped and auditable record of a second set of binary code changes to the digital asset;
   changing the pro rata contribution of the first binary code, the second binary code, and the third binary code to the binary code;
   iterating on the process, to account for all nested binary code changes to any registered digital asset, and author affiliations, without limit to the number of relationships;
   receiving a licensing request from a user for read permission on a first registered digital asset;
   communicating the licensing request to all affiliated authors including: the first author, the second author, and the third author, of the first registered digital asset;
   receiving approval from all of the affiliated for the licensing request;
   receiving a royalty payment from the user for the licensing request; and
   distributing the royalty payment to all of the affiliated based on the pro rata contribution.

2. The process of claim 1, further comprising embedding a time stamped and audible record of a second authorship metadata into the digital asset ascribing ownership of the first set of binary code changes to the second author.

3. The process of claim 2, further comprising nesting attribution relationships to a subsequent author.

4. A non-transitory computer readable medium storing a program which, when executed by at least one processing unit of a computing device, determines at least one author of a digital asset in binary format, the program comprising instructions for:
   adding a first binary code to the digital asset by a first author; wherein the digital asset is a three-dimensional design further comprising a general binary code indicating whether material is present for every point in a three-dimensional space defined within the digital asset;
   storing and registering in a system of records, a record of a first ownership metadata into the digital asset;
   ascribing an ownership of the first binary code to the first author;
   embedding a first licensing metadata into the digital asset with a time-stamped and auditable record ascribing readability to a first user;
   securing the digital asset by requiring a digital key to obtain access to write changes to the digital asset;
   digitally associating a first derivative work metadata into the digital asset ascribing writing permission to a second author;
   adding a second binary code to the digital asset by the second author; storing and registering a time-stamped and auditable record of a first set of binary code changes to the digital asset;
   determining pro rata contribution of the first binary code and the second binary code to the binary code;
   digitally associating a second derivative work metadata into the digital asset ascribing writing permission to a third author;
   adding a third binary code to the digital asset by a third author; storing a time-stamped and auditable record of a second set of binary code changes to the digital asset;

changing the pro rata contribution of the first binary code, the second binary code, and the third binary code to the binary code;

iterating on the process, to account for all nested binary code changes to any registered digital asset and author affiliations, without limit to the number of relationships;

receiving a licensing request from a user for read permission on a first registered digital asset;

communicating the licensing request to all affiliated authors including: the first author, the second author, and the third author, of the first registered digital asset;

receiving approval from all of the affiliated authors for the licensing request;

receiving a royalty payment from the user for the licensing request; and distributing the royalty payment to all of the affiliated authors based on the pro rata contribution.

5. The non-transitory computer readable medium of claim 4, wherein the program further comprises instructions for:

receiving a known number of new digital assets into the system of records;

setting a counter to one;

engaging a relationship inference engine to process the new digital assets into the system of records until the counter is equal to the known number of the new digital assets by iteratively performing the following steps:

examining the new digital asset for the authorship metadata;

executing a new digital binary code to form a three-dimensional digital image;

executing a binary code of each digital asset in the system of records to form a first set of three dimensional digital images;

comparing a new digital asset surface curvature with a digital asset surface curvature for each digital asset in the system of records;

comparing a descriptive metadata inside the digital asset to the system of records;

determining an authorship of the new digital asset;

adding the new digital asset to the system of records; and incrementing the counter.

* * * * *